Oct. 15, 1963  B. SCHECHTER  3,107,287
THERMAL WIRE STRIPPER
Filed Nov. 15, 1961  2 Sheets-Sheet 1

INVENTOR.
BERNARD SCHECHTER
BY *Allan Rotenberg*
ATTORNEY

Oct. 15, 1963  B. SCHECHTER  3,107,287
THERMAL WIRE STRIPPER
Filed Nov. 15, 1961  2 Sheets-Sheet 2

INVENTOR.
BERNARD SCHECHTER
BY Allan Rothenberg
ATTORNEY 3,107,287
THERMAL WIRE STRIPPER
Bernard Schechter, West Covina, Calif., assignor to North American Aviation, Inc.
Filed Nov. 15, 1961, Ser. No. 152,456
5 Claims. (Cl. 219—29)

This invention relates to apparatus for removing insulation from wires and more particularly concerns a device wherein insulation to be removed is severed by thermal means before being stripped from the wire.

The stripping of insulation from the ends of electrically conductive wire for purposes of making necessary electrical and mechanical connections, is generally achieved by mechanical means which cut through the insulation of a wire before removing the same. Such devices frequently result in damage to the wire in the form of a nick or cut in the wire itself. In many applications, particularly those in which the apparatus incorporating the wires is subject to severe environmental accelerations, failure is often caused by electrical wires which have been weakened or damaged during the insulation stripping process. In fact, it is quite possible that a complex apparatus such as, for example, a multimillion dollar missile may be lost because of the failure of a single electrical wire connection, which failure may be traced to damage caused to the wire during the stripping of insulation. The problem of wire stripping is severe and much effort has been expended in its solution. One type of solution has been the substitution of thermal cutting for mechanical cutting of the insulation.

In a device such as that shown in the patent to K. L. Arntzen, No. 2,768,276, a double heating element is clamped down about the wire and severs the insulation which accordingly may be removed by withdrawing the wire from the clamping heater element. Such a device puts a strain on the heater element which is caused to bear against the bare wire during the removal of the latter. When the wire is dragged over this double clamping heater element, hardening of the wire takes place. Furthermore, strands of the wire may be contaminated by insulating oxides and residue of the melted insulation. The entire bare end of the wire will contact the heater in prior devices, often resulting in contamination of the wire which makes it unfit for use.

Accordingly, it is an object of this invention to provide an improved thermal wire stripping device which neither contaminates, mars, nor damages the wire during the insulation stripping process.

In carrying out the principles of the invention in accordance with a preferred embodiment thereof, apparatus is provided which achieves the wire stripping in essentially three steps. The wire is moved relative to a heating element to cause contact between the wire and the heating element at only one side of the wire. The wire to be stripped is clamped between its end and the point at which the insulation is to be cut. Having thermally severed the insulation on one side of the wire, further relative motion of the clamped wire and heating element is effected to cause contact of the heating element with the other side of the wire to complete the thermal melting or cutting of the entire periphery of the insulation without at any time clamping the wire by the heater itself. Accordingly, upon completion of the thermal severing of the insulation, the end portion of the insulation remains clamped and severed and the wire itself may be withdrawn without any further contact with the heating element.

The structure which provides for this operation comprises a heater and a wire holding clamp which is mounted for motion relative to the heater. Operating means are also provided to effect motion of the clamp means relative to the heater so as to achieve successive contacts between the heater and different circumferentially spaced portions of the wire which is held in the clamp means.

In a disclosed embodiment of a manually operated device embodying the principles of this invention, there are provided first and second support or handle elements mounted for motion relative to each other in a selected direction; a heater which may be of a single piece of wire or two fixedly related elements has first and second parts thereof fixed to one of the handle elements and spaced from each other in the direction of relative motion of the handle elements. The wire to be stripped is inserted through the space between the heater portions to where it may be clamped by first and second clamp members respectively carried by the first and second handle elements. The structure is arranged so that the clamp elements, upon clamping the wire, can move the wire relative to the heater to cause contact of the heater first with the one side of the wire and then with the opposite side. Preferably the clamping elements are initially moveable relative to each other in order to effect the clamping action and then are moveable in clamped relation and in unison to achieve the motion of the wire relative to the heater element so as to cause successive momentary contact of the heater with different peripheral portions of the wire to be stripped.

It will be seen that an object of the invention is to provide a thermal wire stripper in which the wire is never clamped by a heater element.

Still another object of the invention is to provide a thermal wire stripper which affords a single-line contact between heater and insulation to be removed.

A further object of the invention is to provide a wire stripper wherein holding pressure is applied only to that portion of the insulation which is to be discarded upon severance.

These and other objects of the invention will become apparent from the following description taken in connection with the accompanying drawings, in which.

In the drawings, like reference numerals refer to like parts.

Figure 1:
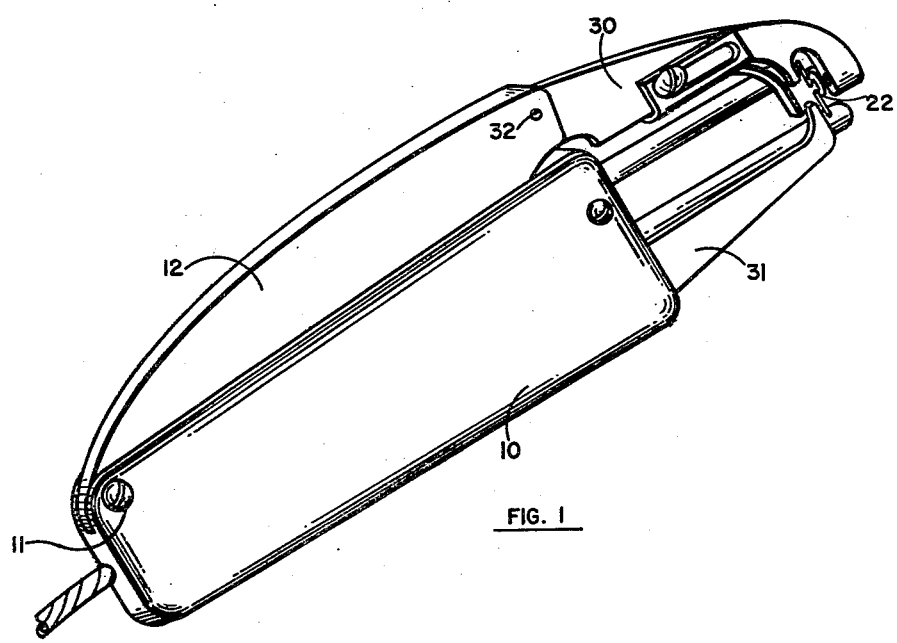
FIG. 1 is a pictorial representation of a preferred embodiment of a thermal wire stripper constructed according to the principles of this invention.
Figure 2:
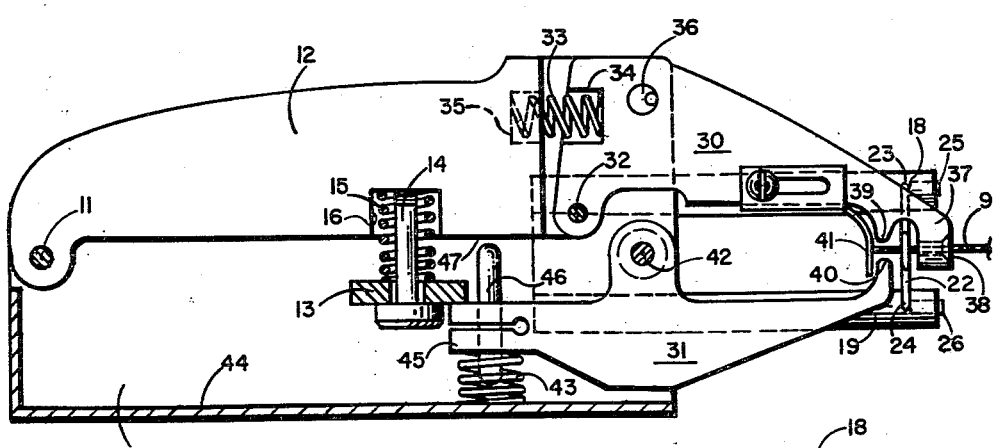
FIG. 2 is a sectional view of the apparatus of FIG. 1.

As illustrated in FIG. 1, there is provided a first handle or lower support element in the form of a channel 10 of U-shaped cross-section to which is pivotally mounted, as at 11, a second upper support or handle element 12. Extending through a flange 13 secured to lower handle element 10, is a bolt 14 threaded in upper handle element 12 and having mounted thereon a spring 15 which abuts both the flange 13 and a cooperating rebated portion 16 of handle element 12 to urge the two handle elements apart to approximately the position illustrated in FIG. 1.

Figure 3:
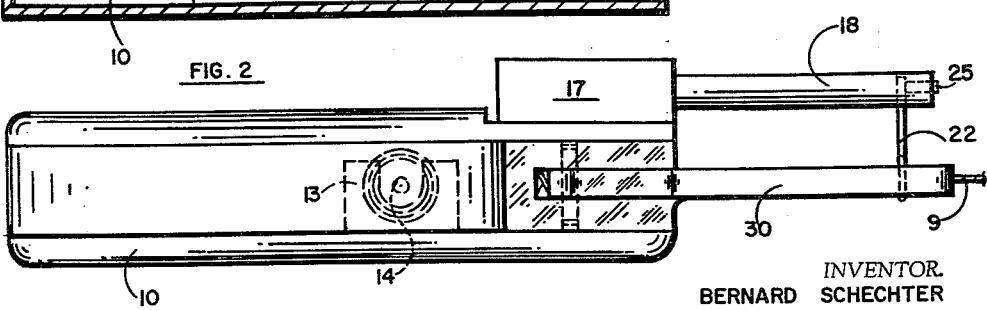
FIG. 3 is a top view of the apparatus of FIG. 1.
Figure 4:
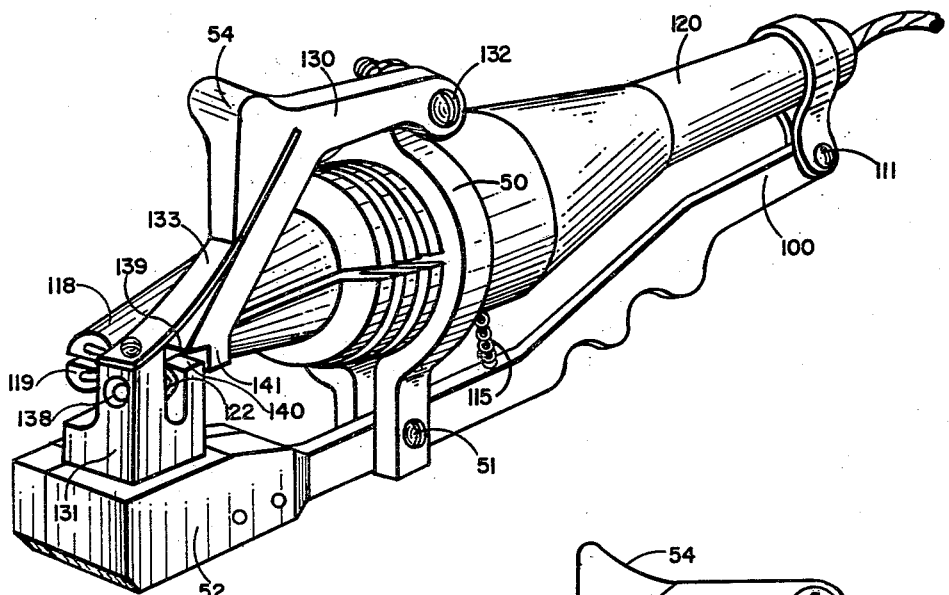
FIG. 4 is a pictorial representation of a second embodiment of the invention.

Secured to the lower handle element 10 is an electrically non-conductive block 17 (FIG. 3) in which are mounted electrically conductive heater-carrying rods 18 and 19 having connecting means (not shown) at the inner ends thereof for connection with the electrical leads of a convenient source of heater power. The leads may be carried through the body of the lower channel member 10 toward the rear thereof. Alternatively the rods may be made non-conductive and provided with longitudinal passages for receiving electrical leads connected to a heater element 22. The heater element 22 of substantially closed loop configuration is mounted to the heater support rods 18 and 19 by insertion of the end portions of the heater element into apertures 23 and 24 formed in the ends of the support rods where the heater may be secured as by locking set screws 25 and 26. The heater has upper and lower portions which are fixedly connected together, being integral in the illustrated one-piece heater. However, it will be readily appreciated that the heater may be made in two elements each mounted in a respective one of support rods 18 and 19 to give substantially the same closed loop configuration for insertion of an insulated wire 9 therethrough.

There is provided a pair of wire holding clamping elements 30 and 31 which are mounted to be moveable relative to each other so they may achieve clamping of the wire to be stripped. The clamping elements are also mounted for motion in unison in their clamping relation relative to the wire 9 extending through heater element 22. The direction of relative motion of the clamping members and heater is substantially parallel to the line extending between the upper and lower portions of the heater 22 and also substantially in the direction of the relative motion between the upper and lower support members 10 and 12. The first clamping member 30 is pivoted at 32 to the upper handle element 12, being urged in a clock-wise direction by means of a spring 33 interposed between a rebated portion 34 of the clamping member 30 and a rebated portion 35 of the upper handle element 12. Motion of clamping member 30 is limited by a lost motion pin and slot connection 36.

The outer end of clamping member 30 extends downwardly as at 37 and is provided with an aperture or wire guide 38 to receive the end portion of the wire from which the insulation is to be removed. It will be noted that in the released position of the apparatus, as illustrated in FIG. 1, the aperture 38 is coaxial with the closed loop of heater 22 whereby insertion of a wire through the aperture 38 will not afford contact of the wire with the heater element. Beyond both the aperture 38 and the heater element 22, the clamp element 30 carries a clamping shoulder 39 which cooperates with a clamping shoulder 40 on the second clamp element 31 to securely hold a wire inserted through the aperture 38 and the loop of heater 22. The extent of insertion of the wire through the heater loop and aperture 38 is limited by abutment of the end of the inserted wire with a stop member 41 adjustably carried by the upper clamp member 30.

The lower clamp element 31 is pivoted to the lower handle element 10 at 42 and is pivotally urged in a clockwise direction by means of a spring 43 interposed between the bottom or bight portion 44 of channel member 10 and a rearward extension 45 of the clamp member 31. The spring is sleeved upon an adjustable stud 46 threaded in the extension 45. Clock-wise motion of the clamp member 31 relative to handle member 10 is limited by engagement of the extension 45 with the flange or shoulder 13 secured to the handle element 10. Stud 46 which is fixed to the clamp member 31 comprises an operator for this member which causes the latter to move counter-clockwise about its pivot 42 when relative pivotal motion of the handle elements 10 and 12 is such as to cause the lower edge 47 of handle element 12 to contact the upper portion of stud 46 as the two handle elements are squeezed together by the operator. By adjustment of bolt 14, rods 18 and 19 may be moved relative to parts 12 and 30 so as to align the aperture 38 with the center of the heater element.

In operation of the wire stripper it will be understood that power is switched on to the heater element by suitable switch means not shown. The wire 9 from which the insulation is to be stripped is inserted through the aperture 38, through the loop in the energized heater element 22, and between the clamping shoulders 39 and 40 until it abuts stop member 41. Thereupon the operator, grasping both handle elements 10 and 12 in one hand, will squeeze the two together. This operation causes upper handle element 12 to move downwardly about its pivot 11 relative to handle element 10 carrying with it (by means of the urging of spring 33) the clamp member 30 and also the wire inserted through aperture 38. The wire is moved downwardly to a position where the bottom portion of the wire contacts the upper surface of the lower portion of the heater element whereby the insulation is thermally severed about the lower peripheral half of the wire. At the same time the clamping shoulder 39 reaches a position whereby it cooperates with the shoulder 40 to clamp the wire therebetween. Continued motion of the handle elements toward each other compresses spring 33 and causes the upper portion of stud 46 to achieve contact with the edge 47 of upper handle element 12. Accordingly upon continued squeezing of elements 10 and 12, edge 47 operates upon stud 46 to urge lower clamp member 31 in a counter-clockwise pivotal direction about its pivot point 42. Counter-clockwise motion of the clamp member 31 is transmited by means of the clamped wire from clamp shoulder 40 to clamp shoulder 39 to cause the upper clamp 30 to move in unison with the lower clamp 31 in a counter-clockwise direction carrying therewith the wire inserted through aperture 38 and further compressing spring 33. Thus the wire is carried upwardly by the upward motion of the two clamping elements relative to the heater 22 whereby the wire has the upper surface thereof come into contact with the lower surface of the upper portion of the heater element to thereby complete the thermal severing of the insulation solely along lines substantially coincident with the extent of the heater element 22.

The operator may then slightly release the pressure on handle elements 10 and 12 allowing spring 33 to cause removal of the wire from contact with the heater element and then he may withdraw the wire while still maintaining the clamping engagement of shoulders 39 and 40 on the severed portion of the insulation. Accordingly, heater contact with the wire has been achieved solely about a circumferential line coinciding with the position of the heater element 22. Upon completion of withdrawal of the wire, pressure on the handle elements is completely released whereby the severed portion of the insulation (clamped between shoulders 39, 40) is released and discarded.

While, in the embodiment of FIG. 1, both the clamping elements are pivotally mounted to the respective handle or support elements, it is only necessary that these clamp elements partake of a motion which is substantially parallel to the direction of a line extending between the two relatively fixed portions (upper and lower) of the heater loop. Since this direction is, of course, substantially linear, it will be seen that one or both of the clamping elements may, accordingly, be mounted for sliding motion in the desired direction which would be substantially vertical in the arrangement of FIG. 1. Illustrated in FIGS. 4–8 is an arrangement where one of the clamping members is pivoted and the other is slidably mounted. In the embodiment of FIGS. 4–8 elements functionally similar to corresponding elements of FIG. 1 are designated by similar reference numerals with, however, the addition of the prefix 1 so that, for example, element 30 of FIG. 1 corresponds to element 130 of FIG. 4.

Lower and upper support or handle elements 100 and 120 are pivoted together at 111 with the upper handle element fixedly carrying mutually spaced (for purposes of insulation) electrically conductive heater support elements 118 and 119 in which are mounted by any suitable means the end portions of a heater element 122 of substantially the same loop configuration as described in connection with the heater element of FIG. 1. A collar 50 secured to upper handle element 120 provides, by means of a pin 51 and a slot (not shown) in element 100, a lost motion connection between the two handle elements to limit the relative motion thereof. A spring 115 is provided between the two handle elements to urge the members apart. An upper clamp member 130 is pivoted at 132 to the upper handle element and provides at a front end portion thereof a clamp shoulder 139 for cooperation with a clamp shoulder 140 on a lower clamp member 131. The latter in this case is not pivoted but is slidably mounted to a fixed extension 52 of handle element 100 for motion (up and down in the illustration) in a direction substantially parallel to a line extending between the upper and lower portions of the loop of heater element 122. A spring 143 (FIG. 5) interposed between the extension 52 of lower handle element 100 and the bottom of the lower clamping member 131 tends to urge the latter upwardly. A leaf spring 133 is secured to the upper portion of the clamp member 131 and engages a shoulder on upper clamp member 130 tending to urge the two clamp shoulders 139 and 140 apart. The wire receiving aperture 138 is provided, in this embodiment, in the lower slidably mounted clamp member 131 and is alined with the loop of heater element 122. A thumb grip 54 is provided on the upper clamp member 130 for individual operation of this member as will be described.

Figure 6:
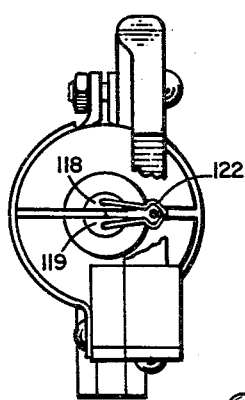
FIGS. 5 and 6 show the details of the apparatus of FIG. 4 in one position.
Figure 5:
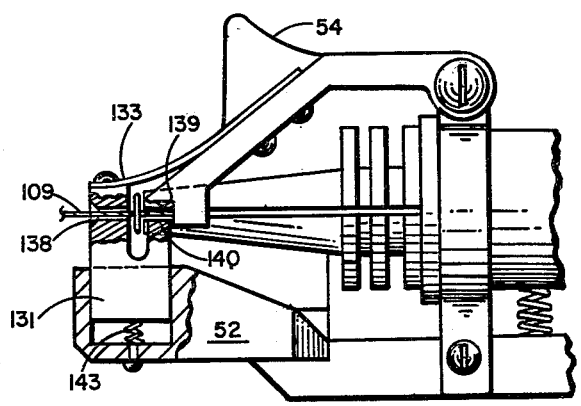
Figure 8:
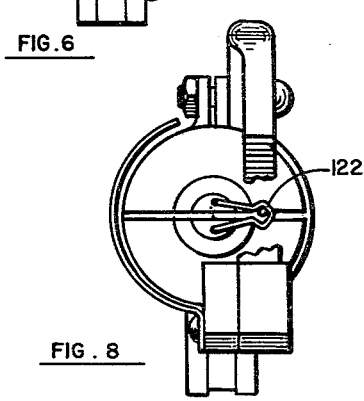
FIGS. 7 and 8 show details of the apparatus of FIG. 4 in a second position.
Figure 7:
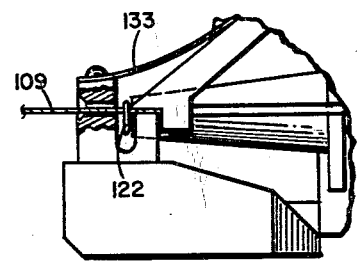

In operation of the embodiment illustrated in FIGS. 4–8, the tool is initially in the position shown in FIGS. 5 and 6. The wire from which the insulation is to be stripped is inserted through the aperture 138 in the lower slidably mounted clamping member 131, thence through the loop in heater element 122 and between the clamping shoulders 139 and 140 to where it will abut a stop 141 member formed as a depending portion of the upper clamp member 130. Upon initial insertion of the wire the insulation is not in contact with the heater element (see FIG. 6) which has been turned on by means of a suitable switch (not shown) and the wire is not clamped by shoulders 139 and 140. Without individually operating upper clamp element 130, the operator will proceed to squeeze together the two handle elements 120 and 100 to cause the heater 122 to move downwardly relative to the clamp member 131 (through which the wire is inserted) whereby the upper portion of the heater loop will contact and thermally sever the upper periphery of the wire insulation (see FIG. 8). Upon completion of such momentary contact, the operator will then proceed to depress the upper clamp member 130 by downward pressure on thumb grip 54 maintaining the compression of spring 115 between the handle members 100 and 120. This operation of upper clamp member 130, relative to the handle member will effect clamping of the wire between the clamp shoulders 139 and 140, and, subsequently, downward motion of the two clamp members (with the wire held therebetween) relative to the upper handle member and the heater 129 which is secured to the latter. Thus, upon operation of the thumb grip 54, the wire clamped between shoulders 130 and 140 is carried downwardly to a point where the upper surface of lower portion of the heater element 122 will thermally sever the lower periphery of the wire insulation. At this time a slight release of pressure of the thumb grip 54 will suffice to remove the momentary contact between the heater and the wire without releasing the clamping engagement upon the now severed portion of the insulation whereby the wire may be withdrawn to detach the severed portion of insulation and the latter may be discarded.

Both of the described manually operated embodiments may be easily modified to provide for foot pedal operation so as to free both hands of the operator if deemed necessary or desirable.

It will be seen that there have been described several embodiments of a new and improved thermal wire stripper which completely obviates pressurized contact between the bare wire and a heater element and achieves the stripping of the wire by effecting motion of a clamp wire relative to a single integral or pair of fixedly related heater elements so that different portions of the insulation to be stripped are successively contacted by the heater. With this arrangement, it is not necessary to simultaneously achieve contact between the heater and opposite sides of the wire whereby the heater is never caused to clamp the wire. Further with this arrangement for successive contact of heater with the clamped wire or with different peripheral portions of the clamped wire, each such contact is of only a momentary duration and all contact of the heater with the wire is released prior to withdrawal of the wire from the stripper apparatus. Accordingly, hardening, contamination, and physical damage of the stripped wire is obviated.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A thermal wire stripper comprising a heater having first and second diametrically opposed portions, wire clamping means mounted for motion relative to said heater, and pressure responsive means for automatically effecting in succession a first motion of said clamping means for clamping a wire from which insulation is to be stripped, a second motion relative to said heater to cause contact between said wire and one of said heater portions and a third motion relative to said heater to cause contact between said wire and the other one of said heater portions, all three motions being in response to continuous pressure in one direction applied to said pressure responsive means.

2. A thermal wire stripper comprising a support including first and second mutually moveable support elements, a heater fixed to one of said elements and having first and second diametrically opposed and fixedly interconnected portions for contacting opposite sides of a wire from which insulation is to be stripped, first and second wire holding clamp members, each moveable mounted to respective support elements for motion relative to each other in response to initial motion of said first and second elements toward each other and for motion in unison relative to the heater in two directions substantially parallel to a line extending between said heater portions in response to further motion of said first and second support elements as they are moved toward each other, thereby clamping said insulation to be stripped and moving it in successive contact with said diametrically opposed portions of said heater in response to one continuous motion in one direction of said first and second support elements relative to each other.

3. The apparatus of claim 2 wherein said clamp members are pivoted to respective support elements, one of said clamp members having an extension positioned to contact the support element upon which the other clamp member is mounted to cause motion of said clamp members relative to the heater in response to said relative motion of said support elements.

4. The apparatus of claim 2 wherein at least one of said clamp members is slidably mounted in a corresponding support member.

5. A thermal wire stripper comprising first and second handle elements pivotally connected to each other, a first clamp member pivoted to said first element and having a wire guiding aperture, a second clamp member pivoted to said second element, said members having cooperating clamp shoulders for holding a wire, said second member having an extension positioned to engage said first handle element when said handle elements are pivoted toward each other whereby said second clamp member is pivoted by said pivoting of the handle elements toward each other and the first clamp member is caused to pivot with said second clamp member by said cooperating shoulders, and a heater element fixed to said second handle element and having a loop adapted to extend freely about a wire held by said shoulders.

References Cited in the file of this patent

UNITED STATES PATENTS

| | | |
|---|---|---|
| 1,351,186 | Nelson | Aug. 31, 1920 |
| 1,595,799 | Massingham | Aug. 10, 1926 |
| 2,192,056 | Watts | Feb. 27, 1940 |
| 2,285,167 | Montgomery | June 2, 1942 |
| 2,768,276 | Arntzen | Oct. 23, 1956 |
| 3,038,985 | Sisk | June 12, 1962 |

FOREIGN PATENTS

| | | |
|---|---|---|
| 593,936 | Great Britain | Oct. 29, 1947 |
| 300,162 | Switzerland | Mar. 1, 1955 |